Feb. 25, 1969 C. L. DILL, JR 3,430,100
AUXILIARY SAFETY MAGNETIC LIGHTING CIRCUIT FOR VEHICLES
Filed Dec. 13, 1966

INVENTOR.
CHARLES L. DILL JR.
BY

United States Patent Office 3,430,100
Patented Feb. 25, 1969

3,430,100
AUXILIARY SAFETY MAGNETIC LIGHTING
CIRCUIT FOR VEHICLES
Charles L. Dill, Jr., Miami, Fla., assignor to
Edward M. Long, Miami, Fla.
Filed Dec. 13, 1966, Ser. No. 601,358
U.S. Cl. 315—78                                2 Claims
Int. Cl. B60q 1/26, 1/02

ABSTRACT OF THE DISCLOSURE

An auxiliary lighting control circuit for vehicles including a relay means responsive to and energized by the operation of the generator regulator when the engine in the vehicle is running for automatically energizing the low beam headlights of the vehicle.

This invention relates in general to automotive vehicles and more particularly to an accessory attachment for maintaining daylight illumination of the vehicle headlights.

It has been statistically proved that daylight use of illuminated headlights are an important factor in the reduction of highway accidents.

Prior auxiliary safety lighting ordinarily consists of the attachment of one or more auxiliary lights applied to the front end of the vehicle and wired to circuits ordinarily energized by the ignition switch of the engine.

Another means for maintaining daylight illumination on the front of a vehicle is accomplished by the wiring of existing headlights or parking lights to the circuit normally energized by the ignition switch.

The aforesaid auxiliary lighting circuits often lead to difficulty inasmuch as the ordinary ignition circuits and their respective fuses or magnetic cut-out means are not designed to carry additional electric loads.

Furthermore, in the event the ignition switch is accidentally left in "on" position without the engine of the vehicle operating, the battery will discharge at a far greater rate through the auxiliary lights than the rate used to energize the ignition coil, and on occasion, no discharge occurs through the coil when the distributor points happen to stop in open position.

The above objections and disadvantages are overcome by the provision of an accessory attachment for circuit connection to the conventional low beam headlight circuit or other frontal lights and the generator cut-out of a vehicle for automatically energizing the daylights only when the engine of the vehicle is operating, which construction is a principal object of the invention.

A further object of the invention is the provision of a relay means in a series circuit means connected to the existing non-grounded conductor of the vehicle lights to be energized and a predetermined existing one of the cut-out terminals of the generator.

These and other objects and advantages in one embodiment of the invention are described and shown in the following specification and drawing, in which.

Figure 1:
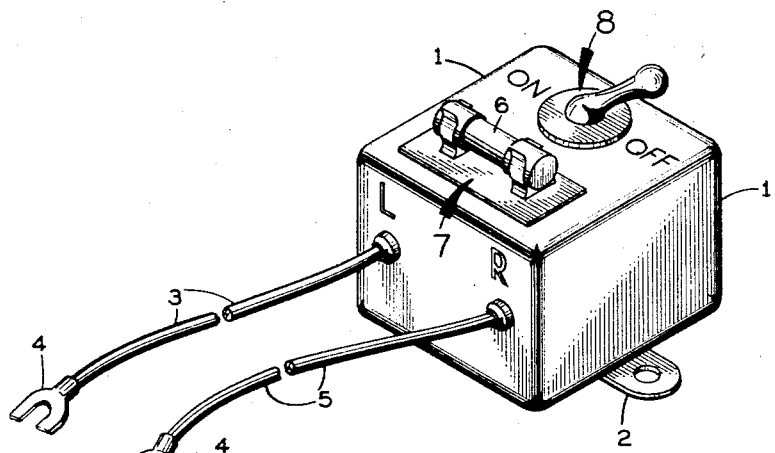
FIG. 1 is a perspective view of the safety light accessory attachment.

The casing 1 is adapted to be secured by any conventional screw means under the hood of the vehicle by ear 2. A flexible insulated wire 3 enters casing 1, marked L for "light" identification, and terminates in a terminal 4. A like wire 5 enters casing 1, marked R for "relay" identification, and terminates in another terminal 4. In practice, terminals 4—4 may be replaced by spring clips for convenience of attachment. A replaceable fuse 6 is retained in a conventional mount assembly 7 secured in the upper side of casing 1, as shown, for protection against the circuits associated with the auxiliary lighting hereinafter described. A conventional S.P.S.T. switch 8 is secured in casing 1 opening the aforesaid circuit when desired.

Figure 2:
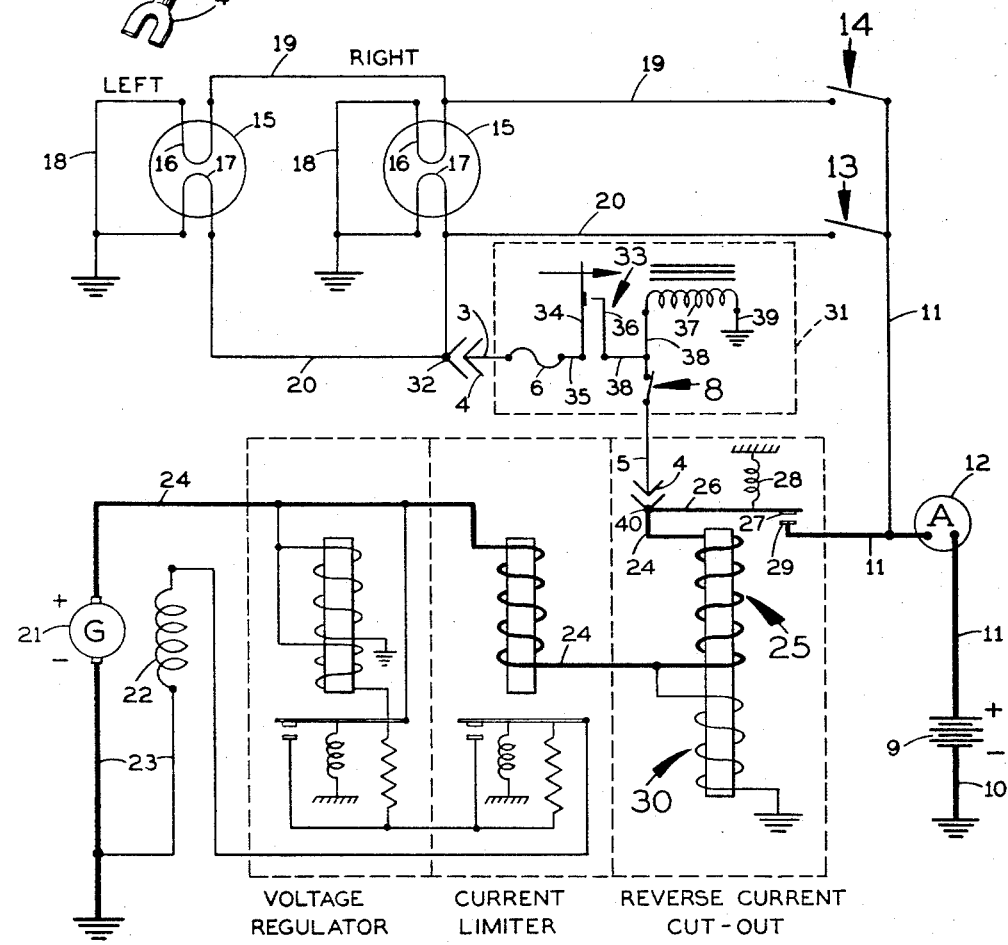
FIG. 2 is a schematic diagram of a portion of a conventional automotive electric circuit including the schematic circuit of the attachment shown in FIG. 1.

Referring to FIG. 2, a portion of a typical schematic automobile circuit is shown wherein a storage battery 9 has the negative terminal thereof connected by conductor 10 to the chassis of the vehicle, which will be hereinafter referred to as a common conducting ground. The positive terminal of the battery is connected by a conductor 11 through ammeter 12 to one terminal of each of the conventional low beam and high beam switches 13 and 14, respectively, as shown. For illustration, a pair of conventional high-low beam head lamps 15, or equivalent pairs of single lamps, have one pair of the terminals thereof connected to ground by conductor 18. The remaining terminals of the high beam filaments 16 are both connected to the remaining terminal of switch 14 by a conductor 19. The remaining terminals of the low beam filaments 17 are both connected to the remaining terminal of the low beam switch 13 by a conductor 20.

Thus it is apparent that the low and high beam filaments of both of the right and left headlights may be simultaneously selectively energized by the conventional operation of well known switches 13 and 14, sometimes attached to a single operating button.

Since only a portion of the generator regulator circuitry shown in the large dotted enclosure in FIG. 2 is used in this invention only that portion shown in heavy lines is directly related to the attachment shown in FIG. 1.

A direct current generator 21 and its related field coil 22 have their negative terminals connected to ground by conductor 23. The positive terminal of the generator 21 is connected to a conductor 24 and this conductor, together with the remaining terminal of the field coil 22 is connected to a regulator assembly, such as the conventional type illustrated in the schematic diagram within the large dotted enclosure. Conductor 24, in addition to being continuous through the current limiter relay, is connected to a low resistance portion of the cut-out relay coil 25, which terminates in relay blade 26 of the armature of the relay, which is common to contact 27 with the latter urged into off or open position by a spring 28, as shown. The mating contact 29 of the cut-out relay completes a circuit to the battery through conductor 11. A high resistance portion of the cut-out relay 30 has one terminal connected to a conductor 24 and the remaining terminal connected to ground.

The daylight lighting accessory shown in FIG. 1 is diagrammatically shown in dotted rectangle 31 in which terminal 4 of conductor 3 is connected to a junction 32 of negative conductor 20. The fuse 6 has one terminal thereof connected to wire 3. A magnetic relay assembly 33 has one terminal of a normally open switch blade 34 thereof connected to the remaining terminal of fuse 6 by conductor 35. The mating relay switch blade 36 is connected to one terminal of the relay coil 37 by a conductor 38. The remaining terminal of the coil is connected to ground by a conductor 39.

The normally closed switch 8 has one pole thereof connected to conductor 38 and the remaining pole connected to conductor 5, which terminates in a terminal 4 connected to junction 40 of the regulator relay blade 26 and conductor 24, as shown.

In operation and when the automotive engine is started, and the generator is operating at any predetermined charging speed, it will operate and energize conductor 24 with reference to ground and complete a circuit through the high resistance portion 30 of the cut-out relay to ground and thus attract the armature and blade 26 against the restraining action of spring 28 to close cut-out contacts 27 and 29, which will complete the battery charge circuit through the low resistance portion 25 of the cut-out relay, which portion will hold the contacts 27 and 29 in closed position for the charge at a well known considerably higher potential than the normal potential of the battery.

Simultaneously the coil 37 of relay assembly 33 will be energized and move blade 34 into contact with the blade 36, thus completing a circuit through low beam filaments 17—17 of both left and right headlights to ground by virtue of the connections of terminals 4—4 engaged with junctions 32 and 40, respectively.

Since the above described frontal illumination can only be energized when the engine is operating, it is apparent that because of the direction of the charging flow of current from the generator that the energy for the illumination is furnished by the generator rather than by the battery.

An important object of this invention resides in the fact that no wiring changes are required in the normal circuitry of the vehicle since all that is required is the attachment of conductors 3 and 5 to existent terminals of the lighting circuit and the regulator assembly. It is now apparent that the relay assembly 33 performs an important function by preventing the flow of battery current from conductor 20 in reverse direction to conductor 24, thus preventing the completion of a circuit to the generator to "motor" same when the normal low beam lights are energized by the closing of the switch 13 and the engine and generator are stopped or idling at low speed. The normally closed switch 8 is provided only to conveniently disable the daylight circuit if desired.

It is to be noted that a suitable resistor may be inserted in series with the relay blades 34 and 36 in the event illumination of lower brilliancy is desired.

It will also be apparent to those skilled in this art that the above described relay circuitry is adapted to vehicles having the alternator type of generator which includes solid state rectifiers, which systems also require a direct current cut-out in the D.C. charging circuit.

It is understood that certain modifications in the above construction, utilizing the features described, are intended to come within the scope of the appended claims.

Having described my invention, I claim:

1. In an engine driven vehicle of the general character described a means forming a common electric conducting ground,
   a storage battery with one terminal thereof connected by a conductor to said ground,
   an electric generator means for charging said battery with one terminal thereof connected to said ground,
   said generator means adapted and constructed for rotation by the said vehicle engine when the latter is operated,
   a charging circuit means connected to said second terminal of said generator and the second terminal of said battery for changing said battery when the generator is rotated by the operation of said engine at a predetermined speed,
   a magnetic cut-out means in said charging circuit for completing the latter when said generator is rotated and for automatically opening said charging circuit when said engine and said generator are operated at a predetermined idling speed,
   an electric light means on the front of said vehicle having a pair of terminals with one terminal thereof connected to said ground,
   a lighting circuit connecting said second terminal of said light means to said second terminal of said battery including a manual "on-off" switch in said circuit for normally energizing said light means when said switch is moved from said "off" to said "on" position,
   an electro-magnetic relay having a coil and a pair of normally open contacts,
   one of said contacts connected to said second terminal of said light means and the remaining said contact and one terminal of said coil connected to said charging circuit between said generator means and said cut-out means and the remaining terminal of said coil connected to ground whereby said light means will be energized when said engine is operated and said relay means is energized and close said contacts and whereby said relay means will de-energize and open said contacts and prevent current flow into said generator means when said switch is "on" and said engine is stopped or idling at low speed.

2. In an engine driven vehicle of the general character described an electric light means on the front of said vehicle,
   a storage battery means in said vehicle including a lighting circuit to said light means for lighting the latter when energized,
   an electric on-off switch means in said lighting circuit for manually energizing same when in said on position for manually energizing said light means,
   an electric generator means adapted and constructed to be rotated by the said engine of said vehicle for charging said battery when rotated at a predetermined minimum speed,
   a charging circuit connecting said generator means to said battery means,
   an electric magnetic cut-out means in said battery charging circuit for completing said charging circuit when said generator means is rotated at said predetermined minimum speed and for opening said charging circuit when said generator means is rotated at a predetermined idling speed or stopped,
   an electro-magnetic relay means connected between said lighting circuit and said charging circuit in the generating side thereof whereby said relay will be energized and in turn energize said light means when said engine is operated and whereby the said contacts of said relay means will prevent current from flowing from said lighting circuit through said generator means when said "on-off" switch is in "on" position and said engine is idling at predetermined idling speed or stopped.

References Cited

UNITED STATES PATENTS

| | | | |
|---|---|---|---|
| 2,751,522 | 6/56 | Spangenberg | 315—79 |
| 3,262,011 | 7/66 | Cones | 315—82 |
| 3,341,736 | 9/67 | Fortney | 315—82 |
| 3,381,170 | 4/68 | Franz | 315—83 |
| 3,382,404 | 5/68 | Baldwin et al. | 315—77 |

JOHN W. HUCKERT, *Primary Examiner.*

A. J. JAMES, *Assistant Examiner.*

U.S. Cl. X.R.

315—76, 79, 82